United States Patent [19]
Labana et al.

[11] 3,940,453
[45] Feb. 24, 1976

[54] METHOD OF PREPARING HOMOGENEOUS THERMOSETTING POWDER PAINT COMPOSITION

[75] Inventors: Santokh S. Labana, Dearborn Heights; Amos Golovoy, Inkster; Henk van Oene, Detroit, all of Mich.

[73] Assignee: Ford Motor Company, Dearborn, Mich.

[22] Filed: Dec. 5, 1973

[21] Appl. No.: 422,230

[52] U.S. Cl. ......... 260/836; 260/42.28; 260/42.29; 260/47 EC; 260/78.4 D; 260/837 R; 260/856; 260/901
[51] Int. Cl.² ........................................ C08L 63/00
[58] Field of Search ............ 260/830 R, 836, 837 R, 260/47 EC, 78.4 D, 856, 901; 117/21

[56] References Cited
UNITED STATES PATENTS

| | | | |
|---|---|---|---|
| 3,028,251 | 4/1962 | Nagel | 117/21 |
| 3,730,930 | 5/1973 | Labana | 260/836 |
| 3,759,854 | 9/1973 | Chang et al | 117/21 |
| 3,781,379 | 12/1973 | Theodore | 260/836 |
| 3,801,348 | 2/1974 | Helm | 117/21 |

*Primary Examiner*—James H. Derrington
*Attorney, Agent, or Firm*—Roger L. May; Keith L. Zerschling

[57] ABSTRACT

A method of preparing a homogeneous thermosetting powder paint composition which cures to form a coating exhibiting outstanding exterior durability, adhesion and impact strength. The method comprises: introducing a liquid including at least a crosslinkable copolymer and an inert solvent into a devolatilizing zone wherein the inert solvent is removed and the nonvolatile material is separated in a molten state; feeding said nonvolatile molten material under pressure into a heated mixing zone comprising a static mixer; simultaneously feeding a stoichiometric quantity (± 30%) of a molten crosslinking agent for said copolymer into said mixing zone under pressure; removing the mixture of nonvolatile molten material and molten crosslinking agent from said mixing zone; cooling said mixture to form a solid material; and purlverizing the solid material to form a powder.

13 Claims, 5 Drawing Figures

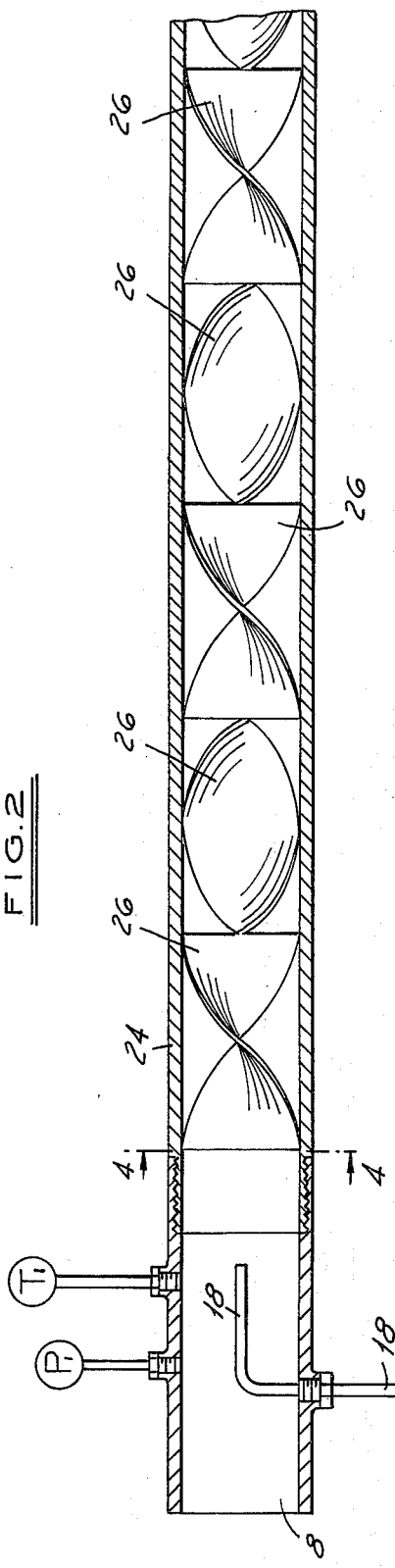
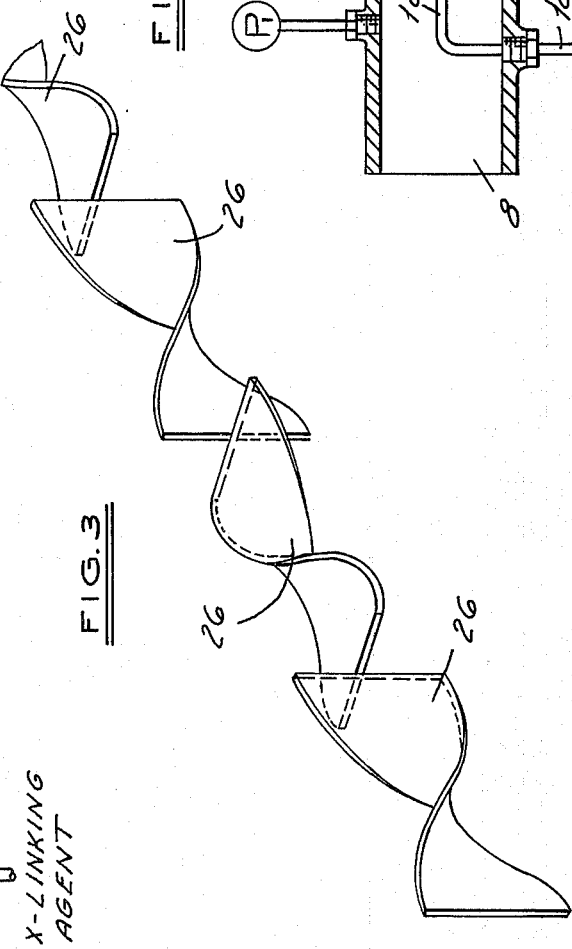
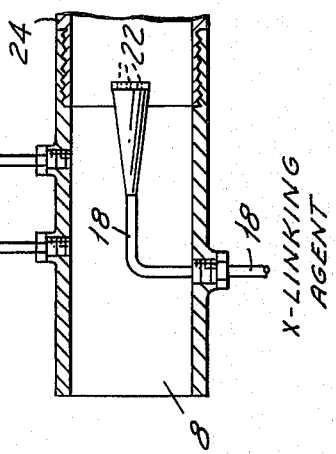
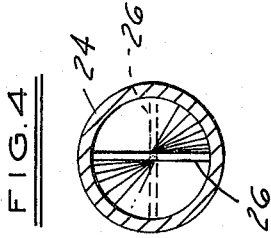

METHOD OF PREPARING HOMOGENEOUS THERMOSETTING POWDER PAINT COMPOSITION

This application relates to a process of preparing powder paint compositions useful for providing protective and decorative surface coatings on a variety of substrates including glass, metal and other substrates which can withstand the curing temperature of the powder. More particularly, this application is directed to a method of preparing homogeneous thermosetting powder paint compositions which cure to form coatings exhibiting outstanding exterior durability, adhesion, impact strength and color match.

BACKGROUND OF THE INVENTION

Powder coating compositions have become increasingly desirable in recent years for various reasons including those relating to ecology, health and safety. More particularly, powder coating compositions are preferable to liquid paints containing volatile solvents which must be volatilized after application, thus resulting in solvents escaping into the atmosphere and creating health and safety hazards as well as undesirable pollution problems. Powder coating compositions, on the other hand, are curable by heat in a manner such that little, if any, volatile material is given off to the environment.

While powder paint compositions have been proposed, coatings formed from such compositions share various problems, most of which at least in part result from the processes by which they are prepared. Prior art manufacturing methods include ball milling, Z-blade mixing and extrusion, all of which suffer from certain deficiencies.

Ball milling is the simplest of these three methods. In the manufacture of epoxy based powder coatings, for example, all ingredients such as granulated epoxy resin, hardener or curing agent, pigments and other additives are loaded into a ceramic lined ball mill. Ceramic grinding media of varied sizes and shapes are generally used to grind the materials for ten to fifteen hours to produce a blend. While other types of ball milling can be used to produce a similar blend in a shorter time, the method is very time consuming and is not adaptable to a continuous process. Also, such a method does not achieve good dispersion of pigments and other additives such as crosslinking agents. Thus the powders formed in such a manner cure to form coatings of exceptionally low gloss and opacity. Still further, such a process does not allow satisfactory color and shade matching.

In Z-blade mixing, resin is first heated in a Z-blade mixer to at least its melting point and when molten all other ingredients except curing agent are added slowly. In general, dispersion requires about 6 hours after which the temperature of the Z-blade mixer is reduced and curing agent added. As soon as the curing agent has been adequately mixed, the melt is cooled, pulverized and classified. The compositions formed by this process generally produce coatings having inadequate pigment dispersion and gloss requirements for top coat uses such as for automobiles. As was the case with ball milling it is also difficult to obtain adequate color and shade matching with this process. Also, since the process is a batch process, the mill has to be thoroughly cleaned after each run because of the build-up of heat sensitive material.

In the extrusion method, the resin being used is blended with all the other ingredients and fed into a heated extruder where high shearing forces are applied to effect mixing of the viscous molten components. Although the powders produced by this method are generally of higher quality than those formed from powders made by processes including ball milling or Z-blade mixing steps, the process still suffers from several serious disadvantages. First, the high shear forces required to effect mixing may cause a loss of color match in the final powder. Second, in such a process the thoroughness of mixing as well as the speed with which an adequately mixed extrudate may be produced will depend on the amount of shear force applied to the material which in turn is a function of the speed at which the extruder screw turns. Thus, in order to achieve rapid, thorough mixing of the viscous resin and molten crosslinking agent the extrusion process has high power requirements and is, therefore, expensive. Third, the process is also expensive because of the relatively high cost of the extrusion equipment. Finally, because of the inherent output limitations on any given extruder, the process is not readily adaptable to varied processing speeds. Thus, the input into the extruder in such a process must be metered to the capacity of the extruder.

The processes disclosed in the applications Ser. No. 389,845 entitled "Method of Preparing Powder Paint Compositions-I" and Ser. No. 389,844 entitled "Method of Preparing Powder Paint Compositions-II", both filed Aug. 20, 1973, overcome many of the problems associated with these prior art processes by accomplishing more complete and uniform dispersion of paint additives. Both processes comprise introducing liquid compositions containing at least a cross-linkable copolymer and uniformly dispersed pigment into an evaporating zone adapted to evaporate the inert solvents contained therein; passing the liquid into a separating zone; causing the solvent vapor to be removed; removing the non-volatile components of the paint in a molten state by gravity; cooling the nonvolatile components; and pulverizing to form a powder. The former application covers processes wherein, if desired, either a self-crosslinking copolymer or a crosslinkable copolymer and a crosslinking agent therefore are included in the liquid paint composition and processed directly through evaporating and separating zones prior to cooling and pulverizing. Such a process has obvious advantages in that all additives including crosslinking agents if employed are uniformly dispersed in the molten resin. However, such a process has the disadvantage that while the molten material is being withdrawn from the separating zone, premature crosslinking may occur. The process of the latter application avoids this problem by processing liquid compositions which contain crosslinkable copolymers but not crosslinking agents and then mixing the powder and crosslinking agent at a temperature greater than the melting point of both components, cooling the resultant molten homogeneous mass to form a solid and then pulverizing to form the final powder. While this process eliminates premature crosslinking the equipment involved is expensive and the process is inefficient because of the number of steps involved.

Accordingly, it is an object of this invention to provide a process of forming powders wherein complete and uniform dispersion of all paint additives including crosslinking agents is effected efficiently in a continuous operation which may be adapted to various processing speeds and at a minimum of expense without resulting in composition degradation or premature crosslinking.

BRIEF DESCRIPTION OF THE INVENTION

The above object is accomplished in accordance with this invention by a process which comprises:

A. introducing a liquid composition comprising a solution of inert solvent and a copolymer containing crosslinkable functional groups, said copolymer having a glass transition temperature in the range of 40°C to 90°C and a number average molecular weight between about 1,000 and about 15,000, into a devolatilizing zone wherein:
  1. the liquid composition is heated above the melting point of said copolymer and above the temperature at which said inert solvent begins to vaporize but below the point at which degradation occurs;
  2. the volatile components are withdrawn from the devolatilizing zone; and
  3. the molten nonvolatile components are collected;

B. feeding said nonvolatile components under pressure at a selected flow rate into a mixing zone comprising a static mixer;

C. simultaneously feeding a molten crosslinking agent for such copolymer into said mixing zone under substantially the same pressure as said nonvolatile components and at a flow rate calculated to provide the mixture with between about 70% and about 130% of the stoichiometric quantity of crosslinking agent for said copolymer;

D. passing said molten nonvolatile components and said crosslinking agent through said mixing zone, which is maintained at a temperature above the melting point of all components but below about 600°F to thoroughly intermix the same;

E. cooling said mixture of nonvolatile components and crosslinking agent to form a solid material; and F. pulverizing said solid material to form a powder.

This continuous process results in powder paints of homogeneous quality as well as excellent color and shade match. Also, because the mixing zone comprises a static mixer, the flow rate of the mixture from the mixing zone may be varied without affecting the quality of the material. Thus, the mixing zone is readily adaptable to handle any amount of nonvolatile components generated by said devolatilizing zone.

Further objects and attendant advantages will become more apparent from the following detailed description when read in conjunction with the accompanying drawings in which:

FIG. 1 shows a schematic diagram of an apparatus suitable for carrying out the invention; and FIG. 2 through 4 show various views of an apparatus suitable as the mixing zone of the invention.

DETAILED DESCRIPTION OF THE INVENTION

Figure 1:
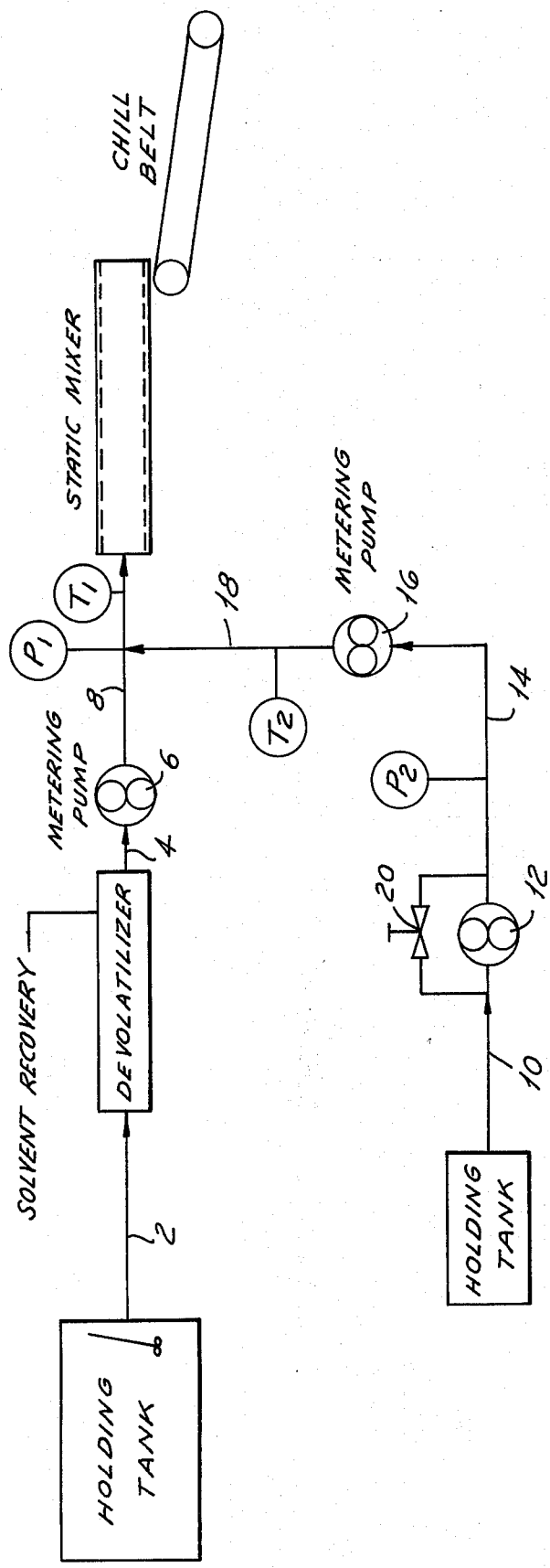

Compositions Useful In The Process of the Invention

Compositions which may be processed by the method of this invention are liquids containing all or nearly all ingredients of the desired powder paint dissolved in inert solvent. Various known liquid paints including those containing epoxy and polyester copolymers as well as the preferred acrylic copolymers may be employed as long as the copolymers have the appropriate glass transition temperatures and molecular weights for forming powders.

Exemplary of a type of liquid paint composition which does not form a suitable powder paint when processed in accordance with this invention is that disclosed in U.S. Pat. No. 2,857,354. The paints of Examples 4 and 5 of that patent do not form dry powders when processed in accordance with this invention while powders prepared from the compositions of Examples 1, 2, 3 and 6, when deposited on a metal panel, do not fuse together to form a smooth film when the panels are baked at 150°C to 200°C for 20 minutes. The baked coatings exhibit poor adhesion, lack of flexibility and very low gloss.

Preferably, the copolymers of the liquid compositions useful in the process have a glass transition temperature (Tg) in the range of 40°C to 90°C and a number average molecular weight ($\overline{M}_n$) of between about 1,000 and about 15,000.

More preferably, the copolymer should have a molecular weight of between about 2,000 and about 8,500. A preferred glass transition temperature is between about 50°C and about 80°C with a molecular weight ($\overline{M}_n$) in the range of 3,000 to 6,500. The most preferred glass transition temperature, however, is 55°C to 70°C with a molecular weight ($\overline{M}_n$) in the range of 3,000 to 4,000.

Pigment preferably is dispersed in the copolymer solution, thus facilitating uniform and accurate color and shade matching prior to forming the powder. The pigmented liquid may be applied to test panels and compared with standard panels for color and shade match in accordance with procedures known to those skilled in the art of color matching liquid paints.

The copolymer solution may also include a flow control agent. Such flow control agents should have a molecular weight above about 100. Preferably, however, the molecular weight ($\overline{M}_n$) should be above about 1,000 and most preferably between about 6,000 and about 20,000. Still other additives such as catalysts, antistatic agents and plasticizers may be dispersed or dissolved in the copolymer solution. These materials may be mixed with the uniformly pigmented powder after processing, if desired. However, the quality of coating obtained from the powder is generally greater if these materials are dispersed prior to processing. The superior quality is a result of more thorough and uniform dispersion of additives.

As mentioned above, the preferred liquids for processing in accordance with this invention contain acrylic copolymers. These acrylic copolymers may be crosslinked by suitable crosslinking agents. Exemplary of the copolymers which may be included in the liquid compositions processed by the method of this invention are those disclosed in U.S. Pat. No. 3,730,930; application Ser. No. 172,222 (now U.S. Pat. No. 3,758,635); 172,223 (now abandoned); 172,224 (now U.S. Pat. 3,781,379); 172,225 (now U.S. Pat. 3,787,520); 172,226 (now U.S. Pat. 3,758,633) 172,228 (now U.S. Pat. 3,758,634); 172,229 (now U.S. Pat. 3,781,380); and 172,236 (now U.S. Pat. 3,752,870), filed Aug. 16, 1971; and application Ser. Nos. 394,874; 394,879; 394,880 and 394,881 filed Sept. 6, 1973, all of which are now abandoned. The copolymers of each of the paints disclosed in these applications bears crosslinkable functional groups selected from epoxy, hydroxyl, amide and carboxyl groups. In addition, each of the paints disclosed in these applications may include the above mentioned additives such as flow control agents, pigments, catalysts, antistatic agents and plasticizers and these two may be included in the liquid compositions being processed.

As noted above, the liquid compositions which may be processed by this invention include all or nearly all of the components of the desired powder paint. Thus, the chemistry recited in the above noted patent and application applies equally to the liquid compositions of this invention, the sole difference being the inclusion of inert solvent in this invention which is ultimately removed. For a more complete description of the preferred compositions for processing in accordance with this invention reference is made to the above-identified applications and patent, the disclosures of which are incorporated hereby by reference.

Method Of Processing Compositions In Accordance With Invention

In accordance with the method of this invention, the liquid composition, preferably comprising a copolymer containing crosslinkable functional groups, a pigment, and a flow control agent is introduced into an apparatus for evaporating and separating the volatile components from the liquid paint to leave a uniformly pigmented molten polymer. An apparatus exemplary of the many types of evaporating and separating systems which could be used is disclosed in U.S. Pat. No. 3,073,380 dated Jan. 15, 1963. While the evaporating and separating means of that apparatus will be discussed in greater detail hereinafter, the disclosure of the above patent is incorporated herein by reference. It will be appreciated, of course, that this disclosure is included merely as an example of a type of apparatus which may be used and is not intended to be limiting.

FIG. 1 diagrammatically shows a suitable apparatus for carrying out the process of the instant invention. In accordance with the invention, the liquid composition is charged to a mixer, not shown, and there agitated to maintain a complete and uniform dispersion of the pigment and various other additives. The mixture is then charged to a holding unit in sufficient amount to allow a continuous feed of material to the remainder of the apparatus. From the holding unit, the liquid composition is fed through feed pipe 2 to a devolatilizer, which may comprise the evaporating and separating means disclosed in the above incorporated patent, at a rate which preferably ranges between about 200 pounds and about 500 pounds per hour, with the most preferred rate of feed being about 400 pounds per hour. As the liquid composition is conveyed from the holding unit it may be passed through a strainer, not shown, to remove any foreign matter.

The evaporating means which may form part of the devolatilizing means may comprise a plate evaporator as disclosed in the above incorporated patent. While the liquid composition is in the plate evaporator, the inert solvent and the other volatile impurities are evaporated as the composition passes between the plates which form a tortuous passageway. The material passes through the evaporator as a homogeneous mixture of a vapor of the volatile components and dispersed particles of molten polymer.

The plate evaporator, the plate arrangement of which is shown in partial cross-section in FIG. 2 of the patent comprises a plurality of plates which are maintained in spaced relationship by gaskets. The plates are formed as a compact unit in a frame-like compression means which compresses the plates against the respective gaskets. This arrangement of plates defines a plurality of spaces therebetween which are in the form of alternate spaces for the passage of the liquid paint and the heating medium, such as superheated steam.

The heating medium should be of such a temperature that it will heat the liquid paint composition to a temperature above the temperature at which the inert solvent of the liquid paint composition begins to vaporize and above the melting point of the copolymer, but below the point at which degradation of the copolymer occurs. Of course, the temperatures at which different liquid paint compositions may be processed according to this method will vary depending on the particular copolymer employed, the particular inert solvent in which the copolymer is dispersed, etc. Broadly, the liquid paint compositions within the purview of this invention may be processed between about 140°F and about 600°F. Preferably, however, the temperature within the evaporating zone is maintained above about 200°F and more preferably the temperature is maintained between about 250°F and about 395°F.

The homogeneous mixture of volatile components and molten polymer components in combination with various other additives of the liquid composition pass through a line into a conical separator as indicated in the patent incoporated above. This separator is maintained at a temperature above the melting point of the nonvolatile components and above the volatilization temperature of the solvent. The conical separator is heated by a jacket and is also maintained at a reduced pressure of between about 10 and about 500 mm Hg., preferably between about 20 and about 30 mm Hg. Also, in accordance with the preferred process, the pipe to the plate evaporator is maintained in an open state thus causing a reduced pressure also to be maintained within the evaporating means. This reduced pressure increases the speed with which the material may be passed through the evaporating means and also effects a more complete vaporization of volatile components. The volatile components of the liquid paint composition are removed from the separator and condensed in a condenser before passing into a solvent receiver. The nonvolatile components of the liquid paint composition then settle to the bottom of separator where they are maintained in a molten state.

A still more detailed description of the evaporating and separating means discussed above as adapted to the devolatilization of liquid paint compositions is contained in the above-mentioned application entitled "Method of Preparing Powder Paint Compositions-I", filed Aug. 20, 1973, the disclosure of which is also hereby incorporated by reference. A modification of this system wherein a tapered screw is included in the conical separating zone to collect and drive the molten polymer from the separating zone is disclosed in the application Ser. No. 422,060, now U.S. Pat. No. 3,880,360 issued Apr. 29, 1975, entitled "Method of Preparing Powder Paint Compositions-III", filed concurrently herewith which disclosure is also incorporated herein by reference. This alternative devolatilization apparatus as well as such apparatus as the "Marco" devolatilizer and the Thin Film Evaporator sold by Pfaudler Corporation are also suitable for devolatilizing the liquid paint composition.

The viscous, molten nonvolatile mixture is withdrawn from the devolatilizing zone and passed through line 4 to metering pump 6. The viscous material is then pumped from metering pump 6 under pressure at a metered flow rate through line 8 at a temperature above the melting point of the polymer but below about 600°F, and preferably between about 180°F and about 400°F. The pressure on the nonvolatile materials is measured by pressure gauge $P_1$, and the temperature is measured by temperature gauge $T_1$. The viscous nonvolatiles including the molten copolymer are then introduced as a first stream at elevated temperature and pressure into the mixing zone which comprises a static mixer indicated on the drawing.

Simultaneously a crosslinking agent for the copolymer of said viscous nonvolatile material is introduced into said mixing zone as a second stream under substantially the same pressure as said nonvolatile components and at a flow rate calculated to provide the mixture with between about 70% and about 130% of the stoichiometric quantity of crosslinking agent for reacting with said copolymer. A supply of said crosslinking agent is maintained in a holding tank, indicated in FIG. 1, at a temperature above its melting point, but below the degradation temperature thereof. Because the molten crosslinking agent is of much lower viscosity than the molten nonvolatile components, two pumps 12 and 16 are employed to pump the crosslinking agent as a second stream into the first stream of nonvolatile components in the desired proportions. Thus, the molten crosslinking agent passes from the holding tank through line 10 to pump 12 which increases the pressure on the crosslinking agent to a level, measured at gauge $P_2$, which is substantially the same as the pressure on the nonvolatile components as measured at $P_1$. The molten crosslinking agent passes from pump 12 through line 14, past pressure gauge $P_2$ and through metering pump 16. Pump 16 serves to meter the flow rate of molten crosslinking agent passing through line 18 to the mixing zone such that the flow rate provides between about 70% and about 130% of the stoichiometric quantity of crosslinking agent required for crosslinking the copolymer in the first stream. Excess crosslinking agent pumped into line 14 by pump 12 is then allowed to flow back toward the holding tank through overflow valve 20. All lines through which the molten crosslinking agent passes are maintained at a temperature above the melting point of the crosslinking agent and this temperature is registered on temperature gauge $T_2$.

The static mixer into which the streams of molten nonvolatiles and molten crosslinking agent pass is shown in greater detail in FIGS. 2 through 4. FIG. 2 shows a cross-sectional view of a static mixer and the portion of the apparatus which serves as the entrance to the mixer. This portion comprises pipe 8 through which the first stream of viscous, molten, nonvolatile components passes into the mixer. Line 18 which carries the molten crosslinking agent passes into line 8 and introduces the second stream of molten crosslinking agent into said first stream of molten nonvolatiles. Because of the difficulty in obtaining a thorough admixing of the viscous nonvolatile components and the much less viscous molten crosslinking agent, it is preferred to introduce the stream of molten crosslinking agent into the stream of molten nonvolatile components at about the center thereof. As an alternative to a single stream of crosslinking agent, the stream may be split into a plurality of smaller streams by passing the stream through an orificed plate 22 at the end of line 18 as shown in FIG. 2a.

The static mixer itself may comprise a conduit which is preferably tubular and includes a plurality of fixed elements. The static mixer preferably includes between about 5 and about 30 of these fixed elements which are adapted to continuously divide and intermix adjacent portions of the stream of molten material as it passes through the mixing zone. Thus, as the mixture of molten nonvolatiles and molten crosslinking agent passes through the mixing zone under pressure it is thoroughly intermixed by being continually divided and recombined.

A preferred static mixer for use in the process of the invention is manufactured by Kenics Corporation of Danvers, Massachusetts and is shown in FIGS. 2 through 4. The mixing elements 26 are serially arranged longitudinally of conduit 24. As can be seen more readily in FIGS. 3 and 4, elements 26 are sheets which are twisted such that their upstream edge and downstream edge are substantially flat and are at an angle relative to each other. The elements are also arranged with respect to each other such that the downstream edge of an element and the upstream edge of the next adjacent element are disposed at an angle relative to each other. Thus, the portion of the stream which passes from the surface of one element is rotating in one direction and is split into two portions by the next adjacent element and said portions are then caused to be rotated in the opposite direction. Greater detail regarding this type of static mixer may be found in the following U.S. patents, the disclosures of which are incorporated herein by reference: 3,286,992 issued Nov. 22, 1966; 3,664,638 issued May 23, 1972; and 3,704,006 issued Nov. 28, 1972.

While the Kenics-type mixers are preferred, other types of static mixers may also be employed in performing the process of this invention. Exemplary of another type of suitable static mixer is the Ross ISG Mixer, manufactured by Charles Ross & Son Co. of Long Island, New York. This type of mixer is disclosed in U.S. Pat. 3,404,869, the disclosure of which is also incorporated herein. Briefly, the mixer comprises a conduit in which a plurality of mixing elements are positioned. Two adjoining elements within the mixer form a tetrahedron and four tubular holes through such element connect one tetrahedron with the next. Starting with two components at the entrance to the first element, these are carried in a pre-determined proportion through each of the four tubular passageways. At the exit from the first element into the first tetrahedral space the four holes are stacked vertically and eight layers emerge. These then expand into the tetrahedral cavity. Entering four openings of the second element are now eight layers in each. After stacking at its exit 32 layers emerge. The number of layers, L, formed follows a geometric progression, according to the formula $L=N(4)^E$, where N=number of components and
E=number of elements.

An important factor in passing the first and second streams of nonvolatile components and crosslinking agent respectively through the mixing zone is the average residence time of the materials within the mixing zone. Since the crosslinking agent and the copolymer are being intimately mixed at elevated temperatures, it is desirable not to prolong the mixing period. Therefore, the average residence time should be less than about one-half the gel time for the crosslinkable system being mixed. A preferred range of average residence time for the preferred compositions processed in accordance with this invention is between about 10 seconds and about 3 minutes. The average residence time may be calculated by the following formula:

$$<t>_{Av} = \frac{\pi R^2 L}{Q}$$

wherein:
$<t>_{Av}$ = average residence time
$R$ = radius of the static mixer
$L$ = length of the static mixer
$Q$ = output rate = total of input rates for components being mixed.

Thus, to obtain a given average residence time various values may be selected for R, L and Q.

The pressure applied to the two streams of material to be mixed may vary widely. Practically speaking, however, the pressure should probably be less than about 500 psi. The pressure selected will, of course, vary with other operating parameters including the rate of output from the mixer, the length of the mixer, the radius of the mixer and the viscosity of the material being mixed. This relationship is represented by the formula:

$$\phi = n(t) \frac{8LQ}{\pi R^4} \times A$$

wherein:
$\phi$ = pressure
$n(t)$ = viscosity
$L$ = length of mixer
$R$ = radius of mixer
$Q$ = rate of output from mixer
$A$ = a constant factor, depending on the detailed geometry of the static mixer.

It should be appreciated that it is within the scope of this invention to employ other apparatus which will accomplish these same steps of evaporating, separating and mixing the various components of the liquid composition. Further, it should be understood that the following specific examples are presented by way of illustration and not by way of limitation.

Example I

A powder paint composition is prepared in the manner set forth below
Preparation of Resin Solution A A reaction flask equipped with a stirrer, thermometer, water condenser and monomer addition funnel is charged with 100 parts by weight of toluene and heated to refluxing temperature of about 110°C. A mixture of 15 parts by weight of glycidyl methacrylate, 45 parts by weight of methyl methacrylate, 40 parts by weight of butyl methacrylate and 3 parts by weight of t-butyl peroctoate is added dropwise through the monomer addition funnel over a period of about 3 hours while agitating and keeping the temperature at reflux. Refluxing is then continued for an additional 3 hours after which time the monomers have converted essentially completely to polymer. The resulting resin solution has a Gardner Holdt bubble viscosity of F to H at 25°C.
Preparation of Pigment Millbase A titanium dioxide pigment millbase is prepared by sand grinding 60 parts by weight of titanium dioxide, 30 parts by weight of Resin Solution A and 10 parts by weight of toluene to a Hegman fineness of 7.5 plus.
Preparation of Pigmented Solution A white pigmented solution is prepared by mixing 45 parts by weight of the titanium dioxide pigment millbase with 57 parts by weight of Resin Solution A and 0.3 parts of polylauryl acrylate ($M_n$=10,000) under agitation for 20 minutes.

This white paint solution is color matched to the desired shade of white with traces of colored pigment millbase by repeatedly applying to test panels.
Preparation of Powder The above paint solution is charged into a feed tank where it is constantly stirred with an agitator. The solution is then fed through a feed pipe with a variable speed positive displacement pump at a rate of 400 pounds per hour to a plate heat exchanger which is heated with super heated steam at 140 psi so as to maintain a temperature of 340–350°F. The volatile components of the paint solution, which consist of toluene and small amounts of unreacted monomers and impurities, are vaporized in the plate heat exchanger to form a two fluid flow of a superheated vapor continuous phase of the volatile components and a discontinuous phase of the non-volatile components of the paint solution. The non-volatile components of the paint solution are suspended in the vapor phase and are exposed continuously to new heated surface resulting in an increasingly concentrated liquid.

The mixture of volatile and non-volatile components passes from the plate heat exchanger and into a conical separator which is heated by the same superheated steam as above flowing through a jacket around the separator. The separator is also maintained at a pressure of approximately 30 mm Hg. The volatile components of the mixture are condensed in a water jacket condenser and collected in a receiving tank. The non-volatile components or the product drops out by gravity to the bottom of the separator in the form of a melt.

The molten material is then pumped at a rate of 200 lbs/hr into a 1 inch diameter Kenics mixer containing 25 fixed mixing elements. The temperature of the molten material is maintained at 275°F and the pressure on the material at the entrance to the mixer is 200 psi. Through a separate line 13 lbs/hour of molten azelaic acid crosslinking agent is passed into said mixer at a pressure of 200 psi and a temperature of 250°F. The molten copolymer-crosslinking agent composition exiting from the mixer is then pumped to a chilled belt fitted with a distributing roll for quick quenching to solid form. The solid product is removed from the chilled belt and deposited in a product bin from which it is conveyed to a pulverizer for milling. This continuous process which can operate indefinitely without fluctuation in the quality of product, is run for 8 hours.
Coating of Substrates The powder paint composition is sprayed onto electrically grounded steel panels using an electrostatic powder spray gun operating at 50KV charging voltage. After spraying, the panel is heated at 175°C for 20 minutes. The paint exhibits good exterior durability, adhesion, impact strength and excellent color match. The same paint composition also exhibits good adhesion on panels of glass, brass, zinc, aluminum, copper and bronze. A comparison of coatings formed from powders produced at various points in the 8 hour run were of uniform quality.

Example II

The procedure of Example I was repeated with the exception that the rate of production and feeding of nonvolatile components into the mixer is increased to 400 lbs/hr while the rate of flow of azelaic acid is changed to 32 lbs/hr. The pressure at the entrance to the Kenics was 400 psi. The quality of coatings formed from powders produced by this process is excellent.

Example III

The procedure of Example I is repeated with the exception that the molten nonvolatile components and crosslinking agent are fed at rates of 50 lbs/hr and 3.5 lbs/hr respectively at a pressure of 40 psi. The resultant powders were of homogeneous quality and produced excellent coatings.

Example IV

The following composition is dired in a Marco devolatilizer:

| | |
|---|---|
| Toluene | 90 parts by weight |
| Glycidyl Methacrylate Copolymer | 100 parts |
| Titanium dioxide | 30 parts |
| Polylauryl acrylate ($\overline{M}_n$=10,000) | 0.5 parts |
| Tetrabutyl ammonium bromide | 0.2 parts |

The glycidyl methacrylate copolymer is the same as that prepared in Example I. The copolymer has a glass transition temperature of 53°C and a molecular weight ($\overline{M}_n$) of 4,000.

The following operating conditions are used for continuous removal of the toluene in the Marco devolatilizer:

| | |
|---|---|
| Rate (Based on solvent-free composition) | 130 lbs/hr. |
| Inlet temperature of solution | 180°C |
| Outlet temperature of solvent-free composition | 130°C |
| Wall temperature of devolatilizer | 180°C |
| Devolatilizer screw speed | 500 rpm |
| Vacuum in devolatilizer | 20 inch Hg |
| Pressure at bottom of devolatilizer | 55 psi |

Under these opeating conditions residual solvent is 1.5% by weight.

The dry molten composition coming out of the devolatilizer is pumped by means of a metering pump into a Kenics mixer at a rate of 130 lbs/hr. All pipe lines including the pump are kept at 120°C by means of electrical heating tapes.

The Kenics mixer is 1 inch in diameter and contains 21 elements. The wall temperature of the Kenics is kept at 110°C. Inlet pressure to the Kenics is 100 psi.

Through a separate line the molten crosslinking agent, e.g., azelaic acid, is pumped into the Kenics mixer at a rate of 10 lbs/hr. Two pumps are employed, the first pump providing high pressure to overcome the high pressure at the entrance to the Kenics and the second pump metering the flow rate of the azelaic acid. The temperature of the azelaic acid at the entrance to the Kenics is 110°C and the pressure is 100 psi.

The molten powder coating composition coming out of the Kenics mixer is immediately cooled to room temperature to effect solidification. The solid composition is then ground in a ball mill to pass through a 140 mesh screen.

The resulting powder is sprayed electrostatically on steel panels and baked at 180°C for 20 minutes to form a continuous coating. The coating has high gloss, good adhesion and good solvent resistance.

Example V

A powder paint composition is prepared in the manner set forth below.
Preparation of Resin Solution A A reaction flask equipped with a stirrer, thermometer, water condenser and monomer additional funnel is charged with 100 parts by weight of methyl ethyl ketone and heated to refluxing temperature of about 80°C. A mixture of 42 parts by weight of methyl methacrylate, 18 parts by weight of glycidyl acrylate, 40 parts by weight of butyl methacrylate and 3 parts by weight of t-butyl peroctoate is added dropwise through the monomer addition funnel over a period of about 3 hours while agitating and keeping the solvent at reflux. Refluxing is then continued for an additional 3 hours after which time the monomers have converted essentially completely to polymer.
Preparation of Pigment Mill Base A titanium dioxide pigment mill base is prepared by dispersing 60 parts by weight of titanium dioxide, 30 parts by weight of Resin Solution A and 10 parts by weight of methyl ethyl ketone.

A pastel mill base is prepared by dispersing 10 parts by weight of chromium green oxide with 70 parts of Resin Solution A and 20 parts of methyl ethyl ketone.
Preparation of Paint Solution A pastel green paint solution is prepared by mixing 17.8 parts by weight of the titanium dioxide pigment mill base with 69.1 parts by weight of Resin Solution A, 2.7 parts of chromium green oxide mill base and 0.3 parts of polylauryl acrylate ($\overline{M}_n$=10,000) under agitation for 20 minutes.

The green paint solution is applied to test panels and color matched to the desired shade of green with traces of mill base.
Preparation of Powder The above paint solution is fed through a plate evaporator as desribed in Example I at a rate of 400 pounds per hour. The temperature within the plate heat evaporator is maintained at about 250°F. The mixture of vapor and nonvolatile components is then fed into a conical separator which is maintained at a pressure of 60 mm Hg where the solvent vapor is removed and the molten polymer allowed to gather in the bottom of the separator. This molten material is then pumped at a flow rate of 200 lbs/hr into a 1 inch Kenics mixer at a temperature of 250°F and under a pressure of 400 psi. Through a separate line 18 lbs/hr of adipic acid crosslinking agent is passed into said mixer at a temperature of 250°F and a pressure of 400 psi. The molten copolymer-crosslinking agent mixture, after passing from the static mixer is then cooled and pulverized as per Example I.
Coating of Substrates The powder paint composition so prepared is sprayed onto electrically grounded steel panels using an electrostatic powder spray gun operating at 50 KV. After spraying, the panel is heated at 170°C for 20 minutes. The paint exhibits good adhesion, good impact, strength and excellent color match. The same paint composition also exhibits good adhesion on panels of glass, brass, zinc, aluminum, copper and bronze.

Example VI

A powder paint composition is prepared in the manner set forth below.

A monomer mixture having the following composition is prepared: glycidyl methacrylate 15% by weight, butyl acrylate 20% by weight and methyl methacrylate 65% by weight. Four weight percent of a catalyst 2,2'-azobis-(2)methylpropionitrile) (AIBN) is dissolved in the monomer mixture. The mixture is slowly added to refluxing toluene (100 parts) which is stirred vigorously under a nitrogen atmosphere. A condenser is provided at the top of the toluene container to condense the toluene vapors and return them to the container. The monomer mixture is added through a regulating valve and the rate of addition is controlled to maintain a reflux temperature with only a small fraction of heat supplied from an external heater. After the addition of the monomer mixture is complete, the refluxing is maintained by external heat for 3 additional hours. The polymer has a glass transition temperature of 65°C and a molecular weight ($\overline{M}_n$) of 3,000.

Preparation of the Mill Base

A titanium dioxide pigment mill base is prepared by sand grinding 60 parts of titanium dioxide, 30 parts of the above resin solution and 10 parts of toluene.

A blue mill base is prepared by sand grinding 10 parts of blue phthaloycanine pigment with 70 parts of the resin solution and 20 parts of toluene.

Preparation of Paint Solution

A pastel blue paint solution is prepared by mixing 17.8 parts by weight of titanium dioxide pigment mill base with 69.1 parts of the resin solution, 2.7 parts of the blue mill base, 0.038 parts of triethylene diamine, 0.019 parts of tetraethyl ammonium chloride and 0.76 parts of polylauryl methacrylate ($\overline{M}_n$=6,000).

Preparation of Powder

The above pigmented liquid composition is fed through a plate evaporator and separator as in Example I. The molten polymer is then passed into a 1 inch Kenics mixer containing 23 fixed elements at a flow rate of 60 lbs/hr under a pressure of 50 psi and at a temperature of 260°F. Simultaneously suberic acid crosslinking agent is introduced into the mixer at a pressure of 50 psi and a flow rate of 5 lbs/hr. The static mixer is maintained at 260°F and as the mixture passes therefrom it is cooled on a chilled belt and pulverized.

Coating of Substrates

The above powder composition is sprayed electrostatically on various substrates as per Example I and cured by heating to 150°C for 15 minutes. The coating obtained had good adhesion to steel, glass, brass, zinc, aluminum, copper and bronze. The coatings also exhibit good impact and excellent color match. The process is operated continuously for 4 hours with no loss of coating quality.

Example VII

A powder paint composition is prepared as follows. A monomer mixture having the following composition is prepared: glycidyl methacrylate 15% by weight, methyl methacrylate 45% by weight and butyl methacrylate 40% by weight. Three weight percent of the catalyst AIBN is dissolved in the monomer mixture which is then slowly added to refluxing toluene and processed in the manner set forth in Example V to form a copolymer having a glass transition temperature of 53°C and a average molecular weight ($\overline{M}_n$) of 4,000.

A titanium dioxide pigment mill base is prepared by sand grinding 60 parts by weight of titanium dioxide, 30 parts by weight of the above resin solution and 10 parts by weight of toluene.

A white paint solution is prepared by mixing 45 parts by weight of the titanium dioxide pigment mill base with 57 parts by weight of the above resin solution, 0.07 parts by weight of tetrabutyl ammonium bromide, and 0.175 parts by weight of polylauryl acrylate ($\overline{M}_n$=10,000). This white paint solution is applied to test panels and color matched to the desired shade of white with traces of colored pigment mill base.

This paint solution is next processed through the plate heat exchanger and separators discussed in Example I with the exception that the temperature within the evaporating zone is maintained at 450°F and the pressure is maintained at 120 mm Hg in the separator.

The molten nonvolatile components are fed from the separator to a 1 inch Kenics mixer containing 15 elements and maintained at 275°F. The material is introduced into the mixer at a flow rate of 300 lbs/hr under a pressure of 220 psi. Simultaneously a molten crosslinking agent comprising 1 part lauric acid and 4.3 parts of azelaic acid is introduced into the mixer at a flow rate of 22 lbs/hr under a pressure of 220 psi. After passing from the static mixer the copolymer-crosslinking agent mixture is cooled and pulverized.

The powder paint composition containing crosslinking agent is electrostatically applied to various substrates which are then heated to 175°C for 20 minutes. The coating composition exhibits good adhesion, impact strength, and color match.

Example VIII

A powder paint composition is prepared in the manner set forth below.

The same copolymer as prepared in Example VII is employed in the paint composition of this example. A titanium dioxide pigment mill base is prepared by sand grinding 60 parts of titanium dioxide, 30 parts of the resin solution and 10 parts of toluene. A yellow mill base is prepared by grinding 10 parts of ferrite yellow pigment with 70 parts of resin solution and 20 parts of toluene.

A pastel yellow paint composition is prepared by mixing 17.8 parts by weight of titanium dioxide pigment mill base with 69.1 parts of the resin solution, 2.7 parts of the yellow mill base, 0.76 parts of tetrabutyl ammonium bromide and 0.190 parts of polylauryl acrylate ($\overline{M}_n$=10,000). This paint solution is applied to various test panels and matched for color and shade against standard panels.

The color matched paint solution is next processed to a pulverized powder in accordance with the processing techniques set forth in Example I with the exception that the crosslinking agent employed is Bisphenol A. The resulting powder is classified by particle size and applied to an electrically grounded, steel panel by using an electrostatic powder spray gun operating at 50 KV charging voltage. After spraying, the panel is heated at 175°C for 20 minutes. The coating obtained on the panel has good adhesion, impact resistance and color match as well as good resistance to toluene, gasoline, butanone or methanol.

Example IX

A powder paint composition is prepared as follows.

A monomer mixture having the following composition is prepared: glycidyl methacrylate 15% by weight, methyl methacrylate 50% by weight and styrene 35% by weight. The monomers are reacted in accordance with the procedure set forth in Example V with 3% by weight of the catalyst AIBN being used. The resultant copolymer has a molecular weight of 4500 and a glass transition temperature of 90°C.

A titanium dioxide pigment mill base is prepared by sand grinding 60 parts of titanium dioxide, 30 parts of the above resin solution and 10 parts of toluene. A yellow mill base is prepared by sand grinding 10 parts of ferrite yellow with 70 parts of the resin solution and 20 parts of toluene.

A pastel yellow paint solution is prepared by mixing 17.8 parts of the titanium dioxide pigment mill base with 69.1 parts of the resin solution, 2.7 parts of the yellow mill base, 0.38 parts of tetramethyl ammonium chloride and 0.76 parts of poly(2-ethylhexyl acrylate). This liquid paint composition is color matched by applying to test panels and adjusting color and shade with additional pigment. The solution is then processed in accordance with the procedure set forth in Example I. The molten pigmented copolymer is then fed at a rate of 150 lbs/hr and a pressure of 250 psi into a 2 inch Ross ISC static mixer containing 10 elements. Simultaneously a carboxy terminated crosslinking agent is introduced at a flow rate of 42 lbs/hr at a temperature of 212°F. The carboxy terminated crosslinking agent is prepared as follows. 500 grams of Epon 1001 (epoxide equivalent 500 g) is charged into a 500 ml stainless steel beaker having a heating mantle. The epoxy resin is heated at 110°C. As the epoxy resin is stirred, 194 grams of azelaic acid is added. After a reaction time of 30 minutes, a homogeneous mixture is obtained. The mixture resin, only semireacted, is poured out into an aluminum pan and cooled. The solid mixture is pulverized to pass through a 100 mesh screen by use of a blender. After passing from the mixer, the molten mixture is cooled and pulverized to form a powder paint.

The powder paint composition is applied to various substrates electrostatically and heated to a temperature of 170°C for a period of 30 minutes. The coatings exhibit good adhesion, impact resistance and color match and the quality of coating does not vary with time of processing.

Example X

A powder paint composition is prepared as follows.

The monomers, glycidyl methacrylate 15% by weight, methyl methacrylate 45% by weight and butyl methacrylate 40% by weight are mixed together. Three percent by weight of the catalyst AIBN is dissolved in the monomer mixture. The mixture is slowly added to refluxing sec-butyl alcohol (100 parts) which is stirred vigorously under a nitrogen atmosphere. A condenser is provided at the top of the alcohol container to condense the alcohol vapors and return them to the container. The monomer mixture is added through a regulating valve and the rate of addition is controlled to maintain a reflux temperature with only a small fraction of heat supplied from an external heater. After the addition of the monomer is complete, refluxing is maintained by external heat source for three additional hours. The copolymer formed by such a solution polymerization process has a glass transition temperature of 53°C and a molecular weight ($\overline{M}_n$=4,000).

A titanium dioxide pigment mill base is prepared by sand grinding 60 parts by weight of titanium dioxide, 30 parts of the above resin solution and 10 parts by weight of sec-butyl alcohol. A paint solution is prepared by mixing 45 parts by weight of the titanium dioxide pigment mill base with 57 parts by weight of the resin solution, 0.076 parts of tetrabutyl ammonium bromide, and 0.175 parts of polylauryl acrylate ($\overline{M}_n$=10,000). This solution is the devolatilized in accordance with the procedure set forth in Example I with the exception that the temperature within the evaporating zone is maintained at 190°F and pressure in the separator maintained at 25 mm Hg.

This molten copolymer solution is then passed into a 2 inch Ross ISG mixer containing 8 elements at a flow rate of 80 lbs/hr, a temperature of 220°F and a pressure of 100 psi. Meanwhile a molten phenolic hydroxy terminated crosslinking agent as disclosed in Ser. No. 172,225 is introduced into said mixer at a flow rate of 17.5 lbs/hr and a pressure of 100 psi.

This molten mixture of copolymer and crosslinking agent is then cooled and pulverized to form a powder paint composition. The powder is then applied to various substrates and heated to a temperature of 175°C for 20 minutes. The coatings exhibit good adhesion, impact strength and color match.

Example XI

A powder paint composition is prepared as follows.

The following mixture of monomers is prepared: glycidyl methacrylate 5% by weight, methyl methacrylate 55% by weight and butyl methacrylate 40% by weight. Three weight percent of the catalyst AIBN is mixed with the monomers and the entire mixture is dissolved in 100 parts of toluene. The reaction is carried out in accordance with the procedure set forth in Example V and the resultant copolymer has a glass transition temperature of 58°C and a molecular weight of 4,000.

A titanium dioxide pigment mill base is prepared by mixing 60 parts of TiO$_2$, 30 parts of the resin solution and 10 parts of toluene. A red mill base is prepared by mixing 10 parts of quindo red pigment with 70 parts of the resin solution and 20 parts of toluene.

A red paint solution is prepared by mixing 17.8 parts by weight of titanium dioxide pigment mill base with 69.1 parts of the resin solution, 2.7 parts of the red mill base, 0.76 parts of tetrabutyl ammonium bromide and 0.190 parts of polylauryl acrylate ($\overline{M}_n$=10,000). This paint solution is sprayed onto test panels and color and shade matched with standard panels. After this matching the solution is devolatilized in accordance with the procedure of Example I.

The molten copolymer is passed into a 1-½ inch Kenics mixer containing 30 fixed elements at a flow rate of 200 lbs/hr, a pressure of 150 psi and a temperature of 230°F. Simultaneously molten maleic anhydride is introduced at a flow rate of 12 lbs/hr under a pressure of 150 psi.

The molten mixture issuing from the mixer is then cooled and pulverized. This powder paint composition is then electrostatically deposited on various substrates. The coatings exhibit good adhesion, good impact strength and color and shade matching.

Example XII

A powder paint composition is prepared as follows.

The following monomer mixture is prepared: metahcrylic acid 5% by weight, methyl methacrylate 50% by weight and butyl methacrylate 45% by weight. This monomer mixture is polymerized in accordance with the procedure set forth in Example VII with three weight percent of AIBN added as a catlyst.

Titanium dioxide and blue pigment mill bases are prepared as in the foregoing examples but with the above resin solution. A liquid paint composition is prepared by mixing 17.8 parts of the titanium dioxide mill base, 69.1 parts of the resin solution, 2.7 parts of the blue mill base, 0.076 parts of tetrabutyl ammonium bromide and 0.190 parts of polylauryl acrylate ($\overline{M}_n$=10,000). The copolymer so obtained has a Tg of 53°C and a molecular weight ($\overline{M}_n$) of 4,000. This liquid paint composition is sprayed on test panels and color matched. The liquid is then processed to a powder in accordance with the procedures of Example I with the exception that the nonvolatile components and crosslinking agent are processed through a 1½ Kenics mixer containing 21 elements. The nonvolatile components are introduced at a flow rate of 200 lbs/hr and a pressure of 175 psi while the crosslinking agent, Epon 1001, is introduced at a flow rate of 12 lbs/hr, a pressure of 175 psi and a temperature of 200°F. The resultant powder is applied to various substrates and cured by heating to 175°C for 20 minutes.

Example XIII

The procedure of Example I is repeated with the exception that molten polyazelaic anhydride is substituted as the crosslinking agent and fed into said mixer at a flow rate of 25 lbs/hr.

Example XIV

The procedure of Example I is repeated with the exception that a molten mixture comprising 2 parts azelaic acid and 1 part polyazelaic acid is introduced into the mixer at a flow rate of 22 lbs/hr.

Example XV

The monomers, methacrylic acid 5% by weight, methyl methacrylate 50% by weight and butyl methacrylate 45% by weight are mixed together. Three weight percent of a catalyst 2,2¹-azobis-(2-methylpropionitrile) (AIBN) is dissolved in the monomer mixture. The mixture is slowly added to refluxing toluene (100 parts) which is stirred vigorously under a nitrogen atmosphere. A condenser is provided at the top of the toluene container to condense the toluene vapors and return them to the container. The monomer mixture is added through a regulating valve and the rate of addition is controlled to maintain a reflux temperature (109°C–112°C) with only a small fraction of heat supplied from an external heater. After the addition of the monomer mixture is complete, the refluxing is maintained by external heat source for 3 additional hours.

Preparation of Pigmented Solution

A white solution is prepared by mixing 45 parts by weight of a titanium dioxide mill base comprising 60 parts titanium dioxide, 30 parts of the resin solution prepared above and 10 parts of toluene with 57 parts by weight of the above resin solution and 0.4 parts of polylauryl acrylate ($\overline{M}_n$=10,000).

Preparation of Powder

The pigmented liquid is processed through a plate heat exchanger and separator in accordance with the procedure of Example I. The molten nonvolatilies exiting from the separator are then fed into a 1 inch diameter Kenics mixer containing 25 fixed elements at 200 lbs/hr at 275°F and a pressure of 200 psi. Through a separate line molten Epon 1001 is fed at a rate of 40 lbs/hr. The mixture is then cooled, pulverized and applied to various substrates at 175°C.

Example XVI

The monomers, 2-hydroxyethylmethacrylate 15 parts, ethyl hexylacrylate 25 parts, methyl methacrylate 60 parts and the initiator 2,2'-azobis-(2-methyl propionitrile) (AIBN) 4 parts are mixed. A one liter, four necked flask is provided which contains 150 ml of toluene and 150 ml of methyl ethyl ketone. The contents of the flask are heated to a refluxing temperature of 85°C. The monomer mixture (208 grams) is added in a dropwise fashion over a period of one and a half hours to the reaction mixture which is maintained at 85°C. After the monomer addition is complete, 0.5 grams of AIBN (dissolved in 20 grams of toluene) is added dropwise. The refluxing is continued for an additional one half hour to complete the polymerization.

To this solution is added 1.6 grams of zinc chloride, 60 grams of titanium dioxide and 1.4 grams of polylauryl acrylate ($\overline{M}_n$=5,000). The solution is then processed through evaporating and separating means as per Example I. The molten nonvolatile exiting from the devolatilizing zone are then fed at a flow rate of 200 lbs/hr into a 1 inch Kenics mixer containing 25 elements. Simultaneously hexamethoxymethyl melamine is fed into the mixer at a flow rate of 12.8 lbs/hr. The mixture exiting from the mixer is then cooled and pulverized. Coatings formed from the resultant powder are of excellent quality.

In view of this disclosure, many modifications of this invention will be apparent to those skilled in the art. It is intended that all such modifications which fall within the true scope of this invention be included within the terms of the appended claims.

We claim:

1. A method of preparing a powder paint composition comprising
   A. Introducing a liquid composition comprising a solution of inert solvent and an acrylic copolymer containing crosslinkable functional groups, said copolymer having a glass transistion temperature in the range of 40°C to 90° C and a number average molecular weight of between about 1,000 to 15,000 into a devolatilizing zone wherein:
      1. the liquid composition is heated above the melting point of said copolymer and above the temperature at which said inert solvent begins to vaporize, but below the point at which degradation occurs;
      2. the volatile components are withdrawn from the volatilizing zone; and
      3. the molten nonvolatile components are collected;
   B. Feeding said nonvolatile components under pressure at a selected flow rate into a static mixer comprising a conduit containing fixed elements;
   C. Simultaneously feeding a molten crosslinking agent for said copolymer into said static mixer under substantially the same pressure as said nonvolatile components and at a flow rate calculated to provide the mixture with between about 70% and about 130% of a stoichiometric quantity of crosslinking agent for said copolymer;

D. Passing said molten nonvolatile components and said crosslinking agent through said static mixer, which is maintained at a temperature above the melting point of all components but below about 600°F, the average residence time of the mixture within the static mixer being less than about one-half the gel time for the crosslinkable system;

E. Cooling said mixture of nonvolatile components and crosslinking agent to form a solid material; and F. Pulverizing said solid material to form a powder.

2. A method in accordance with claim 1 wherein the average residence time of the mixture is between about 10 seconds and about 3 minutes.

3. A method in accordance with claim 1 wherein said conduit is a tubular member containing between about 5 and about 30 elements adapted to continuously divide and intermix adjacent portions of the stream of molten material as it passes through said static mixer.

4. A method in accordance with claim 1, wherein said elements are curved sheets extending longitudinally of said conduit in a serial manner and wherein consecutive elements are curved in opposite directions.

5. A method in accordance with claim 4 wherein each sheet is twisted such that its upstream and downstream edges are substantially flat and are at an angle to each other and wherein the downstream edge of an element and the upstream edge of a next adjacent element are disposed at an angle relative to each other.

6. A method in accordance with claim 1 wherein said nonvolatile components are introduced into said static mixer as a first stream and said molten crosslinking agent is introduced into said static mixer as a second stream at about the center of said first stream.

7. A method in accordance with claim 6 wherein said second stream comprises a plurality of fine streams.

8. A method in accordance with claim 1 wherein said nonvolatile components and said molten crosslinking agent are introduced into said static mixer at a pressure of less than about 50 pounds per square inch.

9. A method of preparing a powder paint composition comprising:

A. Introducing a liquid composition comprising a solution of inert solvent and an acrylic copolymer containing crosslinkable functional groups selected from the group consisting of epoxy, hydroxyl, amide and carboxyl groups, said copolymer having a glass transition temperature in the range of 40°C to 90°C and a number average molecular weight of between about 1,000 and about 15,000, into a devolatilizing zone wherein:

1. the liquid composition is heated above the melting point of said copolymer and above the temperature at which said inert solvent begins to vaporize, but below the point at which degradation occurs;

2. the volatile components are withdrawn from the devolatilizing zone; and 3. the molten nonvolatile components are collected;

B. Feeding said nonvolatile components at a first stream under pressure at a selected flow rate into a static mixer comprising a conduit containing fixed elements;

C. Simultaneously feed a molten crosslinking agent for said copolymer as a second stream into said static mixer under substantially the same pressure as said nonvolatile components and at a flow rate calculated to provide the mixture with between about 70% and about 130% of the stoichiometric quantity of crosslinking agent for said copolymer, said second stream being introduced at about the center of said first stream;

D. Passing said molten nonvolatile components and said crosslinking agent through said static mixer, which is maintained at a temperature above the melting point of all components but below about 600°F. to thoroughly intermix the same, the average residence time of the mixture within the static mixer being less than about one-half the gel time for the crosslinkable system;

E. Cooling said mixture of nonvolatile components and crosslinking agent to form a solid material; and F. Pulverizing said solid material to form a powder.

10. A method in accordance with claim 9 wherein the average residence time of the mixture is between about 10 seconds and about 3 minutes.

11. A method in accordance with claim 9 wherein said fixed elements are adapted to continuously divide and intermix adjacent portions of the stream of molten material as it passes through said static mixer.

12. A method in accordance with claim 11 wherein said conduit contains between about 5 and about 30 elements and wherein said nonvolatile components and said crosslinking agent are fed into said static mixer at a pressure of less than about 500 psi.

13. A method in accordance with claim 9 wherein said second stream comprises a plurality of smaller streams.

* * * * *